United States Patent [19]
Rettig et al.

[11] Patent Number: 4,815,187
[45] Date of Patent: Mar. 28, 1989

[54] APPARATUS FOR FITTING A PROTECTIVE BOOT PARTICULARLY FOR ARTICULATED JOINT ASSEMBLIES

[75] Inventors: Helmut Rettig; Karl Weiss, St. Augustin; Erich Buss, Cologne, all of Fed. Rep. of Germany

[73] Assignee: Uni-Cardan Aktiengesellschaft, Siegburg, Fed. Rep. of Germany

[21] Appl. No.: 7,784

[22] Filed: Jan. 28, 1987

[30] Foreign Application Priority Data

Jan. 31, 1986 [DE] Fed. Rep. of Germany ....... 3602867

[51] Int. Cl.$^4$ ............................................. B23P 19/02
[52] U.S. Cl. ........................................ 29/235; 29/450; 29/789
[58] Field of Search ................. 29/235, 422, 448, 450, 29/789, 797; 464/175

[56] References Cited

U.S. PATENT DOCUMENTS

| 2,086,371 | 7/1937 | Tear | 29/235 |
| 2,618,051 | 11/1952 | Endicott | 29/235 |
| 3,393,440 | 7/1968 | Wilson | 29/235 |
| 3,710,693 | 1/1973 | Marhold | 29/235 X |
| 3,756,064 | 9/1973 | Erdmann | 29/235 X |
| 4,360,209 | 11/1982 | Ukai et al. | 464/175 |
| 4,564,988 | 1/1986 | Norrod | 29/235 |

FOREIGN PATENT DOCUMENTS

| 87221 | 1/1972 | German Democratic Rep. |
| 837728 | 6/1981 | U.S.S.R. | 29/235 |
| 1559211 | 1/1980 | United Kingdom |

Primary Examiner—Timothy V. Eley
Assistant Examiner—Andrew E. Rawlins
Attorney, Agent, or Firm—Toren, McGeady & Associates

[57] ABSTRACT

A device for fitting a protective boot to a shaft member particularly in a universal joint wherein an expanding device is provided for expanding the diameter of a first collar of the boot so that a shaft upon which the boot is to be mounted may be inserted into the assembly device and the boot. A stripping device cooperates with the expanding device and is axially movable relative thereto so that the stripping device will leave a receiving region of the expanding device radially freely accessible in order to engage the first collar of the boot thereon. After the shaft member has been positioned with the first collar of the boot extending thereabout, the stripping device is moved relative to the expanding device so that the collar may be slipped off the expanding device and onto a recess in the shaft upon which it is to be mounted. The invention is particularly suitable for use in automated assembly of propeller shafts.

7 Claims, 9 Drawing Sheets

APPARATUS FOR FITTING A PROTECTIVE BOOT PARTICULARLY FOR ARTICULATED JOINT ASSEMBLIES

BACKGROUND OF THE INVENTION

1. Field of the Invention

The present invention relates generally to an assembly apparatus and more particularly to a device for fitting a protective boot to a shaft particularly in an articulated joint assembly.

2. Description of the Related Art

As a rule, boots serve to seal parts in a universal joint which are connected to each other so as to be articulated, in particular, rotating parts forming an angle relative to each other during operation of the joint. Collar regions of the boot, preferably under internal tension, have to be made to rest in a predetermined position against one of the parts of the joint particularly within an annular groove.

The present invention is directed particularly to an apparatus of the type which comprises a first device preferably suitable for fitting a first collar region of the boot and a second device preferably suitable for fitting a second collar region of the boot having a larger cross section. The application of the invention is significant particularly for the complete automated assembly of propeller shafts.

Economic production of propeller shafts which can be supplied to the customer in a condition ready for installation requires a high degree of automation. So far, the assembly of propeller shafts has largely been of a manual nature, especially fitting the boots has to be regarded as a weak area rendering more complicated a higher degree of automation. So far, it has been common practice to slip the boot with its smaller diameter onto the corresponding seating region of the shaft, then to connect the shaft to the finish-assembled constant velocity joint and, subsequently, manually, to pull the larger open end of the boot over the outer joint member. This purely mechanical method of assembly is laborious and time-consuming.

SUMMARY OF THE INVENTION

The present invention is directed toward provision of a device which permits an automated assembly of boots and which represent a definite improvement as compared to the conventional manual method of fitting a boot.

An essential constituent of the invention is a feeding device which permits an axial relative movement between a holding device for the shaft member on the one hand and different manipulating devices for the boot on the other hand. As a rule, the method in accordance with the invention will be performed in such a way that the propeller shaft is firmly clamped axially and moved forward in cycles perpendicularly of the axial direction into an assembly station having a device in accordance with the invention and that in this assembly station, all the manipulating devices mentioned are moved relative to the fixed shaft and relative to each other in different procedural stages.

Needless to say, a reversal is also possible in that instead of one of the manipulating devices, the holding device for the shaft member may be axially movable. To permit adaptation to different shaft shapes and boot lengths, the feeding device is preferably numerically controllable. In a preferred embodiment, all manipulating devices are arranged on a frame or slide connected to the axially movable part of the feeding device and the connection may be separated by a high-speed coupling, for example, for quickly resetting the device for a different boot or joint type.

One of the advantages of this device is that complex movements can be effected in an easy way by a few adjusting drives. It is particularly advantageous to arrange the adjusting drives exclusively in a coaxial way, thereby permitting a compact design. To the extent that the adjusting drives are arranged radially for the purpose of adjusting a gripping device and an expanding device, they are preferably connected to pairs of actuating elements. The adjusting drives are usually provided in the form of pneumatic cylinders permitting high operating speeds. The devices in accordance with the invention are of extremely simple design and their movable parts are all guided in a straight line by articulated levers.

The various features of novelty which characterize the invention are pointed out with particularity in the claims annexed to and forming a part of this disclosure. For a better understanding of the invention, its operating advantages and specific objectives attained by its use, reference should be had to the drawings and descriptive matter in which there are illustrated and described the preferred embodiments of the invention.

DETAILED DESCRIPTION OF THE PREFERRED EMBODIMENTS

Referring to FIGS. 1 to 4, wherein identical parts have been given the same reference numbers, a first embodiment of the invention is shown as comprising a frame 1 formed of a base plate 2, a multitude of stay bolts 3 and an annular disc 4. The annular disc 4 is integral with a tubular stripper 5 which, in adaptation of the extending boots, has been provided with a stripper cone 6 tapered towards the front and a front stripping sleeve 7. However, depending on the shape of the boot, a cylindrical shape of the stripper 5 is also within the scope of the invention.

A bearing housing 8, guided so as to be axially movable on the stay bolts 3, is provided at an end face facing the stripper 5 with stay bearing blocks 9 for supporting expanding levers 10. The expanding levers 10 are adapted across the length of the shape of the stripper 5 and their cross sections form complementary circular segments. A preferred embodiment comprises three expanding levers 10. Within the expanding levers 10, provision has been made for a segmented stop cone 11 connected to and cooperating with an axially movable expanding cylinder 13.

An adjusting drive for the expanding cylinder 13 is accommodated in the housing 8 which supports the levers 10. When operating the adjusting drive, the expanding cylinder 13 moves axially relative to the expanding levers 10, moves up to and rests against the stop cone 11 and adjusts the expanding levers 10.

In adaptation of the shape of the stripper 5, the expanding levers 10, in total, form a transition cone 12 divided in the longitudinal direction and a front receiving region 16 consisting of cylindrical segments for a first collar B1 of a boot F. The expanding levers 10 have each been provided with projections 14 which, when withdrawing the expanding cylinder 13, come into contact with adjusting screws 15 attached to the housing and limit radially inwardly the path of the segments of the receiving region 16 of the expanding levers.

If the expanding cylinder 13 is moved forward, the path of the expanding levers 10 is limited radially outwardly by the front stripping sleeve 7 of the stripper 5. The bearing housing 8, guided on the stay bolts 3 of the frame 1, is connected to a number of guiding rods 17 which are guided in bores of the base plate 2 and connected to each other via a head plate 18. An adjusting drive for the housing 8 together with the expanding device 30 has been provided with an adjusting cylinder 19 bolted to the base plate 2 and a piston rod 20 coupled with the head plate 18. By operating this adjusting drive for the stripping device 24, the expanding device 30, as a whole, can be moved axially relative to the frame 1, and, thus, relative to the stripping device 24 with the stripping device 24 being stationary relative to a feed device (not illustrated).

Figure 1:
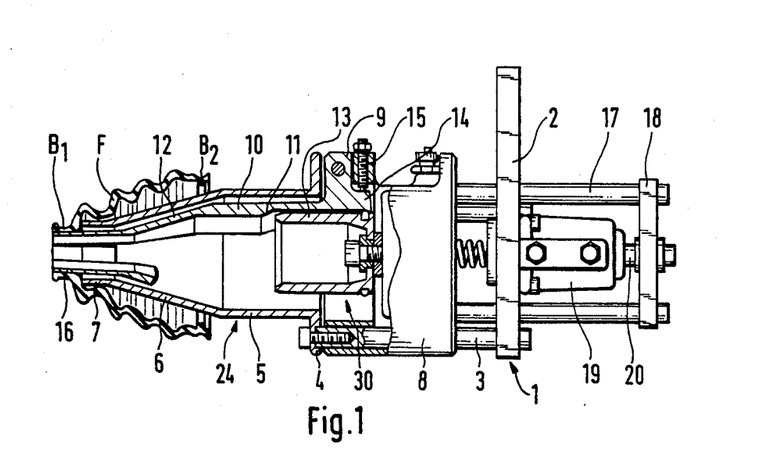
FIGS. 1-4 are views which show, in longitudinal section, a device of a first embodiment in four different operating positions.

In a starting position to FIG. 1, the expanding piston 13 is withdrawn relative to the expanding levers 10 so that the receiving region 16 of the expanding levers 10 is moved radially inwardly, whereas, at the same time, the expanding device 30, relative to the stripping device 24, is displaced in such a way that the receiving region 16 of the expanding levers 10 projects from the stripping sleeve 7. In this position, the boot F together with its lefthand collar B1 can be pushed manually without any resistance onto the receiving region 16, or the boot fed in in any way can be held in such a way—for instance, clamped in from the outside at the collar B1 or clamped on from the inside at the righthand collar B2—that the receiving region 16 can be introduced into the collar B1 by a forward movement of the entire frame by means of the feeding device (not illustrated).

When slipping the boot F onto the receiving region 16, the collar B1 is essentially untensioned, with unintentional dropping of the boot F onto a shaft member W—for instance, during the forward movement of the frame 1—being prevented from circumferentially extending grooves in the receiving region 16 of the levers or by a small external bead (not illustrated) at the end of the receiving region 16.

Figure 2:
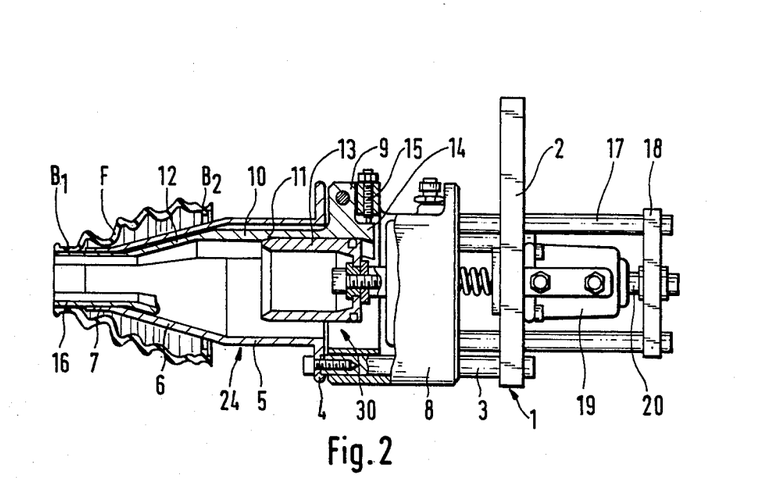

FIG. 2 shows the expanding levers 10 in an expanded position achieved by moving the expanding cylinder 13 forwards towards the left against the inner stop cone faces 11 of the expanding levers 10, the cross section of the collar B1 of the boot F being enlarged to such an extent that its inner diameter permits free insertion of a shaft member W onto which the boot F with its collar B1 is intended to be fitted under pretension. The position of the stripping device 24 relative to the expanding device 30 remains unchanged, i.e., the receiving region 16 of the stripping sleeve 7 protrudes axially.

Figure 3:
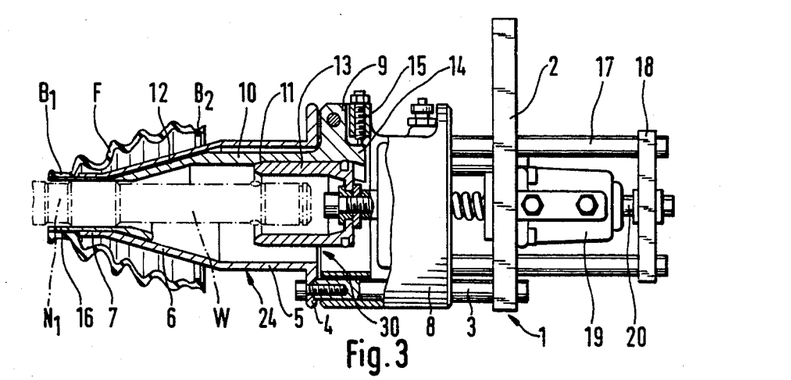

It can be seen in FIG. 3 that the shaft member W is inserted coaxially into the region of the expanding levers 10 and the stripping device and thus into the boot F. As compared to FIG. 2, the relative positions of the devices arranged at the frame 1 are unchanged. However, as a rule, the shaft member W is inserted in such a way that the whole of frame 1 is slipped onto the shaft end of the axially held shaft member W by means of the feeding device (not illustrated). It can be seen that the length of the stripper 5 and of the expanding levers 10 is essentially determined by the planned position of the collar B1 of the boot F, and, thus, by the position of a groove N in the shaft member W relative to the end of the shaft member W. The design of the expanding cylinder 13 permits accommodation of the front shaft end, and, thus, a shortened design of the expanding and stripping devices.

Figure 4:
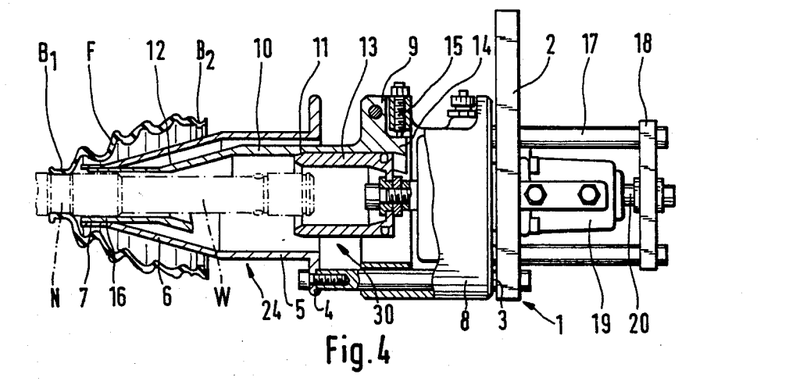

FIG. 4 shows how, by operating the adjusting drive, the guiding rods 17 together with the bearing housing 8 and the expanding levers 10 contained therein can be moved to the right relative to the frame 1 with the stripper 5 fixed therein, with the stripping sleeve 7 in the end position shown moving across the receiving region 16 of the expanding levers 10. In the process, the collar B1 presses against the end face of the stripping sleeve 7, remains in an axially unchanged position and, after withdrawal of the receiving region 16, sealingly encloses the shaft member W while accurately engaging the groove N. After completion of this process and achieving the position illustrated, the entire frame 1 may be withdrawn from the shaft member W by the feeding device (not illustrated) and, at the same time, or subsequently, the expanding cylinder 13 may be withdrawn relative to the bearing housing 8 receiving its adjusting drive. It is then possible to move on the shaft transversely of the axial direction and to feed in a further shaft part and boot, whereupon the entire process is repeated.

Figure 5:
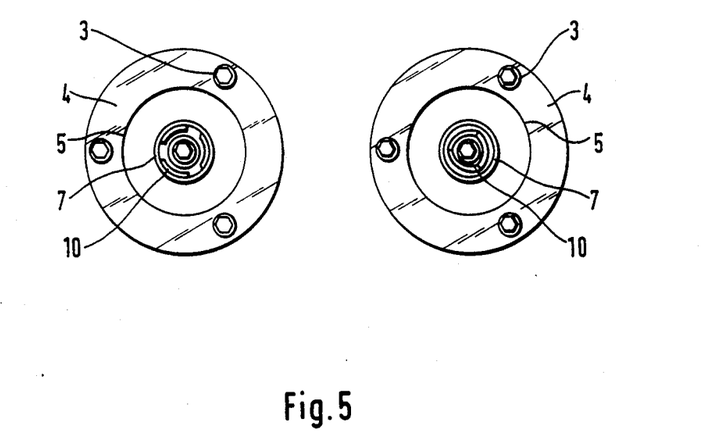
FIG. 5 is a cross section of a device according to FIGS. 1-4.

FIG. 5 shows in detail that the stripper 5 attached to the annular plate 4 held by stay bolts 3 has a closed circular cross section and comprises a closed circular front stripping sleeve, whereas the expanding levers, in their cross section, form circular segments and, in total, consist of cylindrical or conical segments.

FIGS. 6 to 10 illustrate a frame 21 essentially consisting of a rear base plate 22, a front base plate 23, an upper longitudinal carrier 25 and several guiding rods 26. By means of a holding device 27, it is possible to connect the frame 21 to the axially movable part of a feeding device (not illustrated) which permits a forward movement in the direction of the guiding rods 26. A gripping device 28 with rotatably supported gripping levers 29 and an expanding device 31 are axially fixed to the frame 21. The gripping device 28 comprises an adjusting drive with an adjusting cylinder 32 connected to the symmetrical gripping levers 29a, 29b via a piston rod 33.

The expanding device 31 comprises two adjusting drives with adjusting cylinders 34a, 34b, each of which acts directly on a first upper expanding lever 35a, 35b and indirectly on a second lower expanding lever 36a, 36b. With fixed rotating shafts 38a, 38b, 39a, 39b, the levers 35a, 36a ,and 35b, 36b are coupled in their movements by a coupling member 37a, 37b which is rotatably supported in both intersecting levers. To offset the circular movement of the levers 35a, 35b, the adjusting drives 34a, 34b, in turn, are oscillatingly suspended in a rotating shaft 40a, 40b supported in a yoke 41a, 41b of a stay bolt assembly 42a, 42b, 43a, 43b. The distance between the expanding levers 35, 36 and the gripping levers 29a, 29b is predetermined, although adjustable, by moving the gripping levers on threaded rods 44a, 44b.

In the frame 21, a stripping device 45 is supported so as to be axially movable on the guiding rods 26, with an adjusting drive with its adjusting cylinder 46 being attached to a carrier plate 47, whereas the movable piston rod 48 is supported on the front base plate 23. The carrier plate 47 having at least one guiding shoe 49 comprises a multitude of stripping punches 50. Furthermore, a further carrier plate 51 is guided on the guiding rods 26 in at least one guiding shoe 52, with a centering cone 53 being attached to the carrier plate 51 by an adjustable threaded rod 54.

The carrier plate 51 is spring-suspended relative to the frame 21 by a spring 56 on a guiding rod 55. Functioning of the device will be explained hereinafter in connection with the subsequent description of the individual figures.

Figure 6:
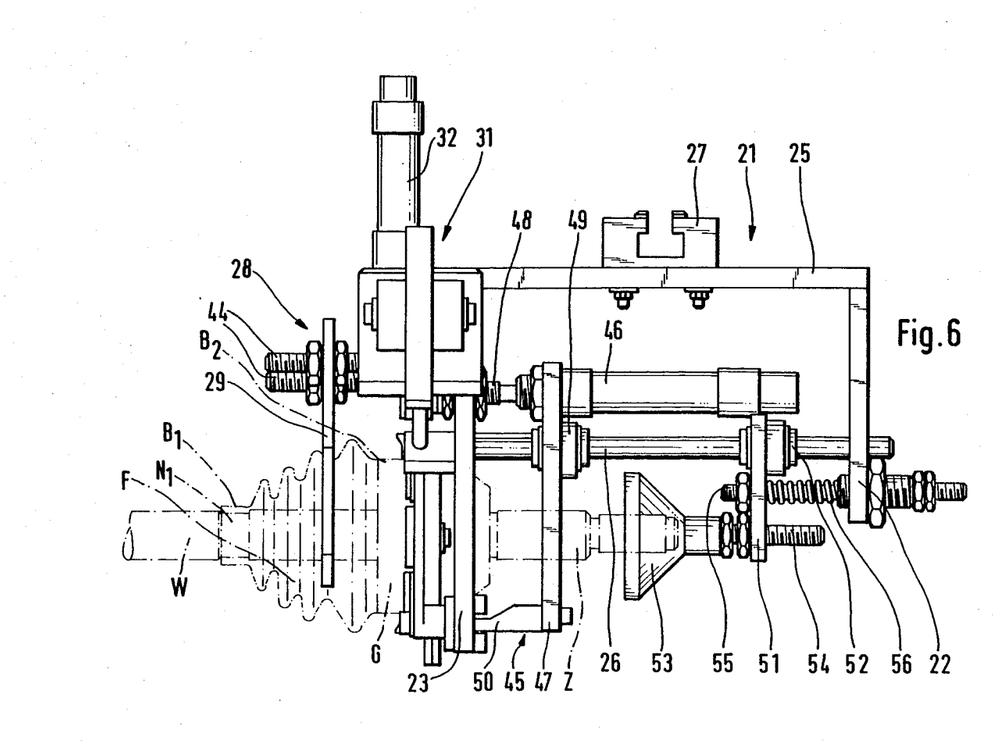
FIGS. 6, 7b and 10 show, in longitudinal section, a device of a second embodiment in different operational positions.

FIG. 6 shows a frame 21 into which a propeller shaft assembly has been fed which, as a rule, is clamped in so as to be stationary, whereas the frame 21 is connected in an axially movable way to a feeding device (not illustrated) and moved across the propeller shaft assembly. The propeller shaft assembly essentially consists of a first shaft end W to which a boot F is attached, with a first collar $B_1$ engaging a groove $N_1$ of the shaft end W. The shaft end W has been fitted with a universal joint whose outer part is followed by a shaft journal Z. The second collar $B_2$ of the boot F rests against the end face of the joint outer part G which has been provided with an appropriate annular groove into which the collar $B_2$ is to engage after completion of the assembly process.

The shaft end W and shaft journal Z, articulated relative to the shaft end W, are coaxially aligned, with the shaft journal Z being centered by the centering bell 35 or cone 53. The gripping levers 29 are axially associated with a first inner fold of the boot F, looking at the assembly from the collar $B_2$. The parts of the expanding device 31 and of the stripping device 45 are at an axial distance from the boot F, with the piston rod 48 being moved into the adjusting cylinder 46 and the ends of the stripping punches 50 at the boot end, in a circumferentially offset way, being axially flush with the receiving regions 57 of the expanding levers 35, 36.

Figure 7A:
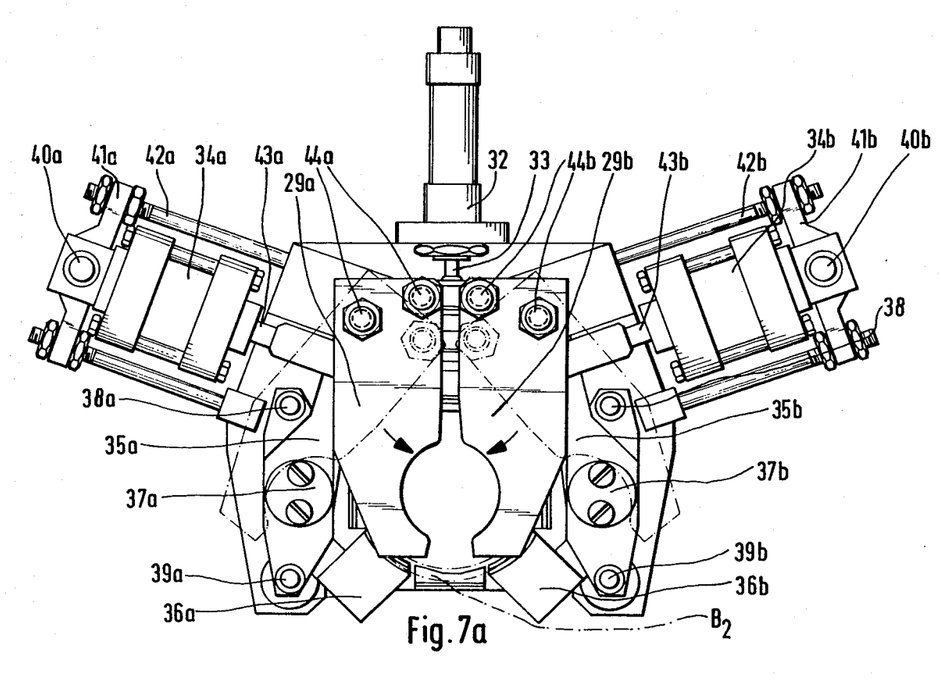
FIGS. 7a, 8a, 8b and 9 are different cross sections of a device according to FIGS. 6, 7b and 10.

FIG. 7a shows in broken lines one of the symmetrically arranged gripping levers 29a, 29b in an open position in which the frame 21 is moved forward across the shaft assembly, as well as the closed position, illustrated in continuous lines, which is achieved when moving the piston rod 33 into the adjusting cylinder 32. In this inwardly extending closed position, the gripping lever 29a, 29b together with the second gripping lever (not illustrated) and arranged symmetrically relative to the gripping lever 29a, 29b embraces the boot F in the above-mentioned inner fold. In the course of axial movement of the closed gripping levers 29 relative to the shaft assembly, the boot F changes its shape and the inner fold is axially moved along.

Figure 7B:
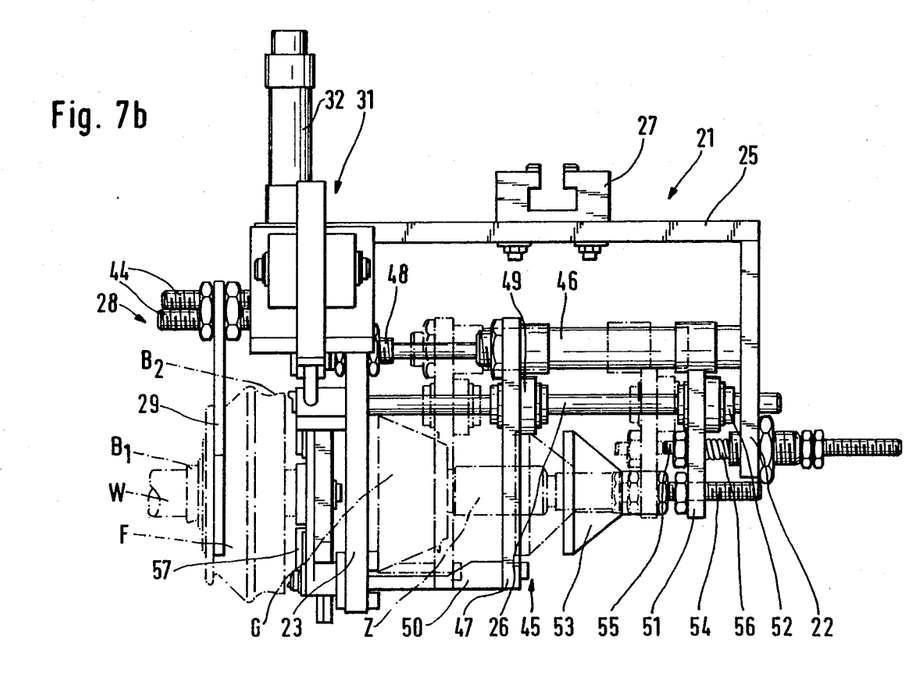

FIG. 7b shows the result of a forward movement of the frame 21 with the closed gripping levers 29 relative to the shaft assembly W. As a result of this movement, the boot F is axially compressed, with its collar $B_2$ to be fixed now being at an axial distance from the end face of the outer joint part G. The distance between the gripping levers 29 and the expanding levers 35, 36 has not changed as compared to the position described in FIG. 7a, whereas, by moving the piston rod 48 out of the adjusting cylinder 46, the stripping punches 50 are axially withdrawn relative to the expanding levers 35, 36. The return of the punches and the advance of the frame 21 may take place simultaneously or consecutively, but in any case, before the release of the gripping levers.

Figure 8A:
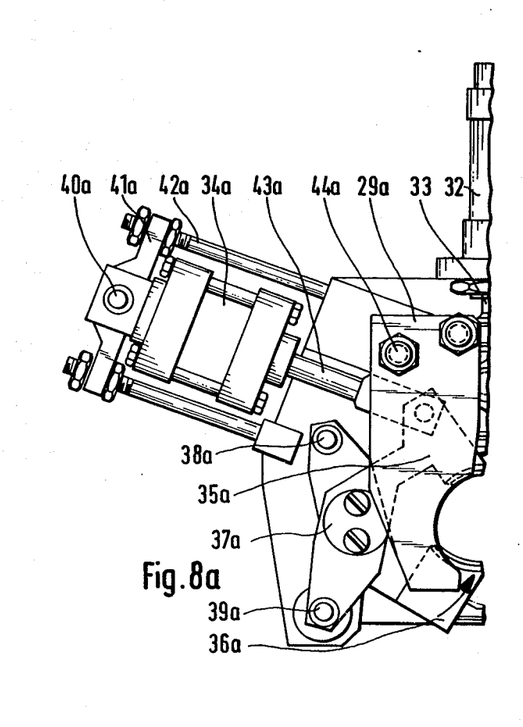
Figure 8B:
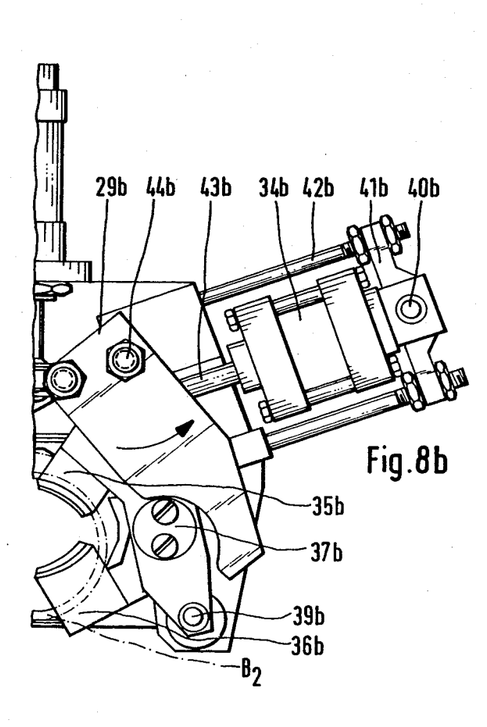

FIGS. 8a, 8b show the expanding levers 35a, 35b, 36a, 36b as well as the gripping levers 29a, 29b which in FIG. 8a are shown in a closed position and in FIG. 8b in an open position. By moving the piston rods 43a, 43b out of the adjusting cylinders 34a, 34b, the expanding levers together with their receiving regions 57 are swivelled in the direction of the central axis of the shaft assembly so that the receiving regions 57 are positioned with the cross section of the collar $B_2$ of the boot F also indicated. When the gripping levers 29 are opened in this predetermined position of the expanding levers, the boot F is partly untensioned in the axial direction and the end face of its collar $B_2$ rests against the expanding levers 35, 36 outside the receiving regions 57.

Figure 9:
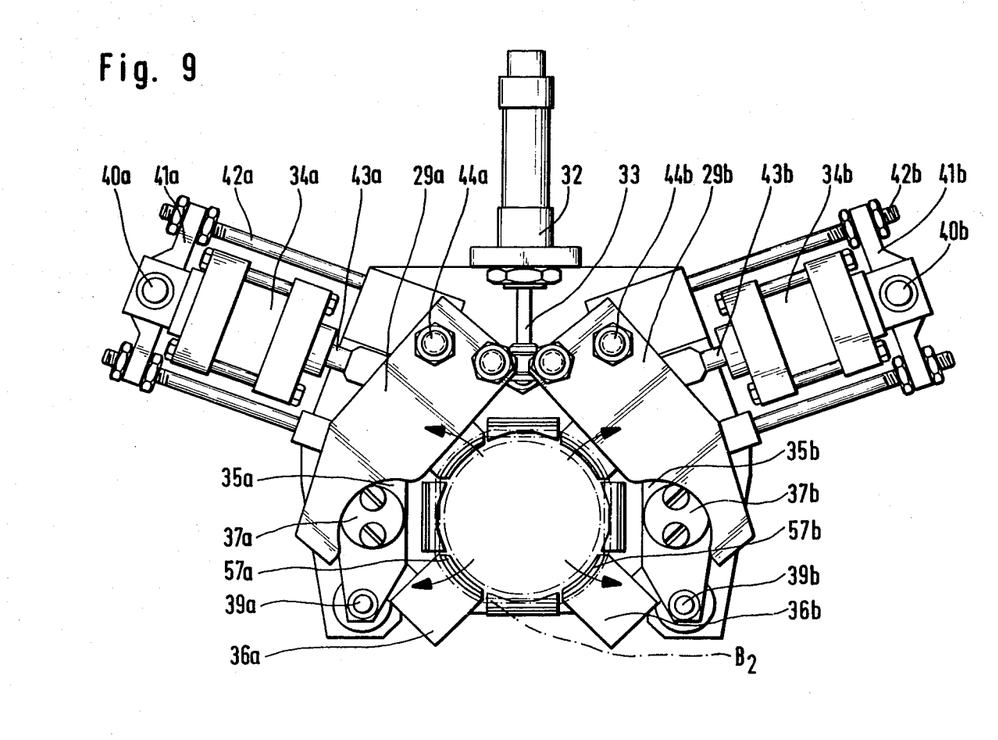

FIG. 9 shows that after opening the gripping levers 29a, 29b, the expanding levers 35, 36, too, are operated by moving the piston rods 43a, 43b into the adjusting cylinders 34a, 34b, with the receiving regions 57 moving approximately radially outwardly. In the process, the collar $B_2$ of the boot F is expanded until the inner contour of the receiving regions 57 and thus also the boot F itself have a larger cross section than the joint outer part G. The circumferential arrangement of the receiving regions 57 relative to the stripping punches 50 whose end faces can be seen in a rear plane, is particularly obvious in this figure.

Figure 10:
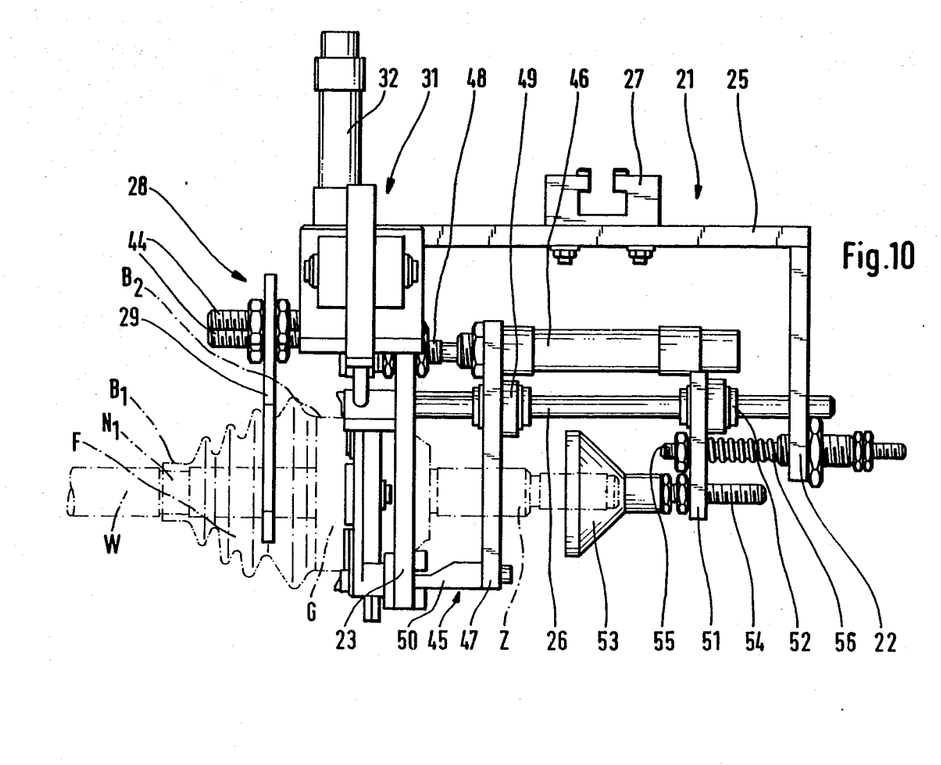

FIG. 10 shows how the frame 21 together with the collar $B_2$ clamped onto the receiving regions 57 has been moved back relative to the propeller shaft assembly, far enough to enable the clamped-on collar $B_2$ to enclose the joint outer part G of the propeller shaft assembly, with the collar $B_2$ being axially pulled back beyond the associated annular groove $N_2$. The expanding levers 35, 36 themselves are shown partly broken away, with the lower receiving regions being shown in plan view and the upper receiving regions being illustrated in cross section.

Within the frame 21, there is an illustration in continuous lines in a withdrawn position of the adjusting drive for the stripper punches 50, with the piston rod 48 being moved out of the adjusting cylinder 46, and a further illustration of the adjusting drive in broken lines in a forward position in which, as shown below, the collar $B_2$ is stripped off the receiving regions 57 of the expanding levers 35, 36 by the stripping punches 50 and snapped into the annular groove $N_2$.

This completes the tensioning process; the frame 21 as a whole may now be moved back relative to the shaft assembly W, after which the latter may be removed from the assembly station vertically of the axial direction, a step which finally completes the assembly of the propeller shaft as a whole, and the station is returned to its starting position as illustrated in FIG. 6, although prior to the release of the next compressed boot, at the latest, the expanding levers 35, 36 have to be moved radially inwards again.

From the foregoing, it will be apparent that the invention relates to a device for and a method of fitting a boot to a shaft or joint member. As a rule, such boots serve to seal parts connected to each other so as to be articulated, in particular, rotating parts forming an angle relative to each other. The collar regions of the boot, preferably under internal tension have to be made to rest against one of the parts in a predetermined position, especially in an annular groove. Thus, it will be seen that the invention generally comprises a first device, preferably suitable for fitting a first collar region and a second device, preferably suitable for fitting the second collar region having a larger cross section, as well as a suitable method. The application of the invention is significant for the complete assembly of propeller shafts.

While specific embodiments of the invention have been shown and described in detail to illustrate the application of the inventive principles, it will be understood that the invention may be embodied otherwise without departing from such principles.

What is claimed is:

1. A device for fitting a protective boot to a shaft or joint member, and particularly for fitting a second collar of said boot to said joint member, with a first collar of said boot being firmly clamped in place, said device being arranged for handling said shaft or joint member and said boot in an essentially coaxial arrangement and comprising in combination:

a gripping device having gripping levers engaging especially in pairs an inner fold of said boot;

an expanding device for a collar of said boot having a receiving region with a circular cross section which, in a first position, has a diameter which is smaller than an inner diameter of said boot collar and which, in a second position, has a diameter which is larger than the outer diameter of said shaft or joint member;

a stripping device having an inner diameter which corresponds approximately to an outer diameter of said expanding device in a tensioned position and which is axially movable relative to the expanding device so that, in a first position, the receiving region of said expanding device and the stripping device are at an axial distance from one another and, in a second position, the receiving region of said expanding device and said stripping device engage each other axially in a circumferentially offset way;

a holding device for said shaft or joint member; and a feeding device which effects axial relative movement between said holding device on the one hand and said gripping, expanding and stripping devices on the other hand and which, in a first position, causes said gripping levers to correspond axially to the inner fold of said boot at said second collar to be fitted and, in a second position, moves said gripping levers in a direction of said first boot collar positioned opposite thereto.

2. A device according to claim 1, further comprising a centering cone for a shaft end which is swivably movable relative to a firmly clamped-in shaft member which is connected to the joint member to which the boot is to be fitted.

3. A device according to claim 2, further comprising a slide frame provided at an axially movable part of said feeding device, said slide frame receiving said gripping device, said expanding device, said stripping device and said centering cone with adjusting drives and adjusting devices thereof.

4. A device according to claim 2, wherein said holding device for said shaft member is axially fixed and wherein said feeding device drives said gripping, expanding and stripping devices and said centering cone in an axially movable way.

5. A device according to claim 1, wherein said expanding device is provided with a plurality of circumferentially distributed levers to which cylindrical segments are attached as receiving regions, said levers attached to rotating shafts which extend parallel to and at the same distances from an axis of said boot, said levers of said expanding device being one-arm levers crossed in pairs and coupled to one another, with one of each being operationally connected to an adjusting cylinder.

6. A device according to claim 1, wherein said feeding device, when in said second position in which said gripping levers are moved axially toward said first boot collar position, causes said expanding device, in said first position thereof, to be inserted in said second boot collar, and, in said second position thereof, to expand said second boot collar, whereby said second boot collar may be drawn over said joint member by said expanding device.

7. A device according to claim 6, wherein said feeding device causes said stripping device to remove said second boot collar from said expanding device after said expanding device has drawn said second boot collar over said joint member.

* * * * *